United States Patent
Seo et al.

(10) Patent No.: US 8,908,308 B1
(45) Date of Patent: Dec. 9, 2014

(54) ADAPTIVE PASSIVE DATA TRACK ERASURE HEALING

(71) Applicant: Seagate Technology LLC, Cupertino, CA (US)

(72) Inventors: You Hwan Seo, Suwon (KR); Haejung Lee, Suwon (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/091,037

(22) Filed: Nov. 26, 2013

(51) Int. Cl.
 *G11B 5/09* (2006.01)
 *G11B 20/10* (2006.01)

(52) U.S. Cl.
 CPC .................. *G11B 20/10481* (2013.01)
 USPC .......................................... 360/45

(58) Field of Classification Search
 None
 See application file for complete search history.

(56) References Cited

U.S. PATENT DOCUMENTS

| | | | |
|---|---|---|---|
| 6,401,214 B1 | 6/2002 | Li | |
| 7,477,465 B2 | 1/2009 | Yu | |
| 7,747,907 B2 | 6/2010 | Olds et al. | |
| 7,765,437 B2 | 7/2010 | Gittins et al. | |
| 8,014,097 B1 | 9/2011 | Sanvido | |
| 8,125,724 B1 | 2/2012 | Nichols et al. | |
| 8,531,793 B2 | 9/2013 | Bandic et al. | |
| 8,537,481 B1 | 9/2013 | Bandic et al. | |
| 2012/0014013 A1* | 1/2012 | Bandic et al. | 360/60 |
| 2013/0242426 A1* | 9/2013 | Bandic et al. | 360/31 |
| 2013/0246703 A1* | 9/2013 | Bandic et al. | 711/113 |

* cited by examiner

Primary Examiner — Daniell L Negron
(74) Attorney, Agent, or Firm — Hall Estill Attorneys at Law

(57) ABSTRACT

A data storage system may be configured with at least a data storage device that has a controller connected to at least a first data writing transducer and a second data writing transducer. The controller may be adapted to set different first and second healing thresholds for the respective data writing transducers in response to passive data track testing.

20 Claims, 4 Drawing Sheets

ADAPTIVE PASSIVE DATA TRACK ERASURE HEALING

SUMMARY

Assorted embodiments may configure a data storage system with at least a data storage device that has a controller connected to at least a first data writing transducer and a second data writing transducer. The controller can be adapted to set different first and second healing thresholds for the respective data writing transducers in response to passive data track testing.

In some embodiments, controls first and second data writing transducers of a data storage device to conduct passive data track testing and set different first and second healing thresholds for the respective data writing transducers in response to the passive data track testing.

A non-limiting embodiment connects a controller of a data storage device with first and second data writing transducer before conducting passive data track testing, predicting an adjacent track erasure (ATE) frequency for each data writing transducer, and setting different first and second healing thresholds for the respective data writing transducers with the controller in response to the passive data track testing and predicted ATE frequency.

DETAILED DESCRIPTION

Advancements in computing devices have reduced form factors while increasing data storage capacity and data access speeds. A mismatch in the magnetic extent of a data writing transducer and the physical size of a data track can result in unwanted erasure of unselected data bits positioned on adjacent data tracks in a condition that can be characterized as adjacent track erasure (ATE). Data tracks proximal to a fixed number of data writing operations can be subsequently read, rewritten, and verified to ensure the data stored on those data tracks are accurate, according to certain embodiments described.

While refreshing a data track can be conducted during selected, convenient system times, such as system idle or low processing conditions, excess power and system processing may be consumed to read and rewrite data tracks that have experienced minimal ATE. With each data writing transducer having different writing characteristics, due to a variety of different structural and operational conditions, conducting data track refreshing operations for all data writing transducers based on a fixed number of proximal data writes can be prohibitive in achieving optimal data reliability and access speed performance.

With these issues in mind, assorted embodiments can configure a data storage system with a data storage device that has a controller connected to first and second data writing transducers where the controller is adapted to set different first and second healing thresholds for the respective data writing transducers in response to passive data track testing. Healing thresholds may be known by other descriptive terms in some embodiments, such as recovery thresholds, error tolerances, or track corrections, among other descriptive terms. The passive data track testing and resultant customized healing threshold in response to such testing can tailor data track maintenance operations to reduce excessive power and system processing while ensuring high stored data accuracy. Furthermore, the passive data track testing can allow the healing thresholds to adapt to changing environmental, structural, and operational conditions that can alter the risk of ATE.

Figure 1:
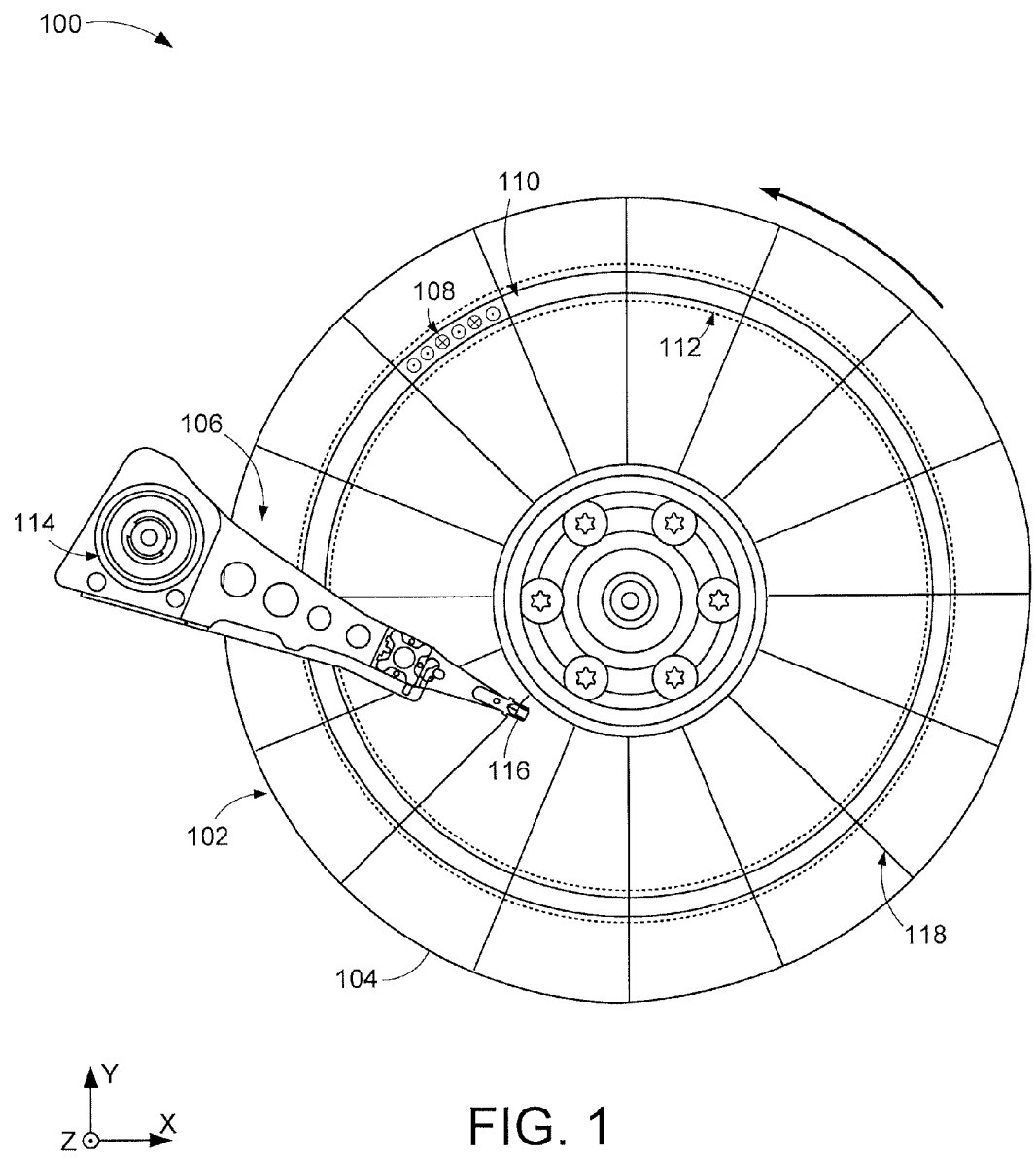
FIG. 1 displays a top view block representation of a portion of an example data storage device capable configured in accordance with various embodiments.

Through the various system configurations, data storage can be facilitated with increased data capacity and data access speeds. However, the miniaturization of the physical size of the data transducing system can pose operating difficulties that can jeopardize the integrity of stored data and performance of the data storage device. FIG. 1 illustrates a top view block representation of a portion of an example data storage device 100 that can experience operational difficulties due to reduced data component physical size. As shown, the disk stack portion 102 of the data storage device 100 has at least one recordable medium 104 that is accessed by an actuating assembly 106 to access data bits 108 that are resident in predetermined data tracks 110.

With the increase in data bit areal density, the width of a data track 110 along the X-Y plane is reduced, which positions data bits 108 of adjacent data tracks 110 perilously close. Such an increase in data bit density can correspond with a data writer's magnetic extent 112 that is larger than the width of the data track 110 due to structural configurations, such as magnetic shielding size and construction in the data writer, and operational configurations, such as high skew angle associated with tilted data writer orientation with respect to the data track due to the actuating assembly 106 pivoting around a single voice coil bearing 114. The larger magnetic extent of the data writer can increase the risk of inadvertent data bit 108 access and erasure as well as increasing the precision necessary for data transducer 116 alignment with a selected data track 110.

The incorporation of servo tracks 118 on the data storage medium 104 can provide overhead operational data, like error correction code and position error signals, that can indicate misalignment of the data transducer 116 and a data track 118. However, a data writer magnetic extent that is larger than the data track can be minimally corrected by data transducer 116 alignment. Hence, inadvertent data erasure can be handled, in various embodiments, by rewriting some or all of a data track in what can be characterized as track "healing" after a fixed number of proximal data writing operations.

While conducting healing operations after a fixed number of proximal data writes can increase data bit reliability, the operations can be expensive in terms of processing and power costs. Conducting healing operations passively can allow the operations to be scheduled and executed without a host command, but can initiate the healing operations at inopportune times in terms of system activities. For example, a passive healing operation can be started during high volumes of system traffic and during increased chances of power shutting off, both of which can be detrimental to data storage system performance.

Figure 2:
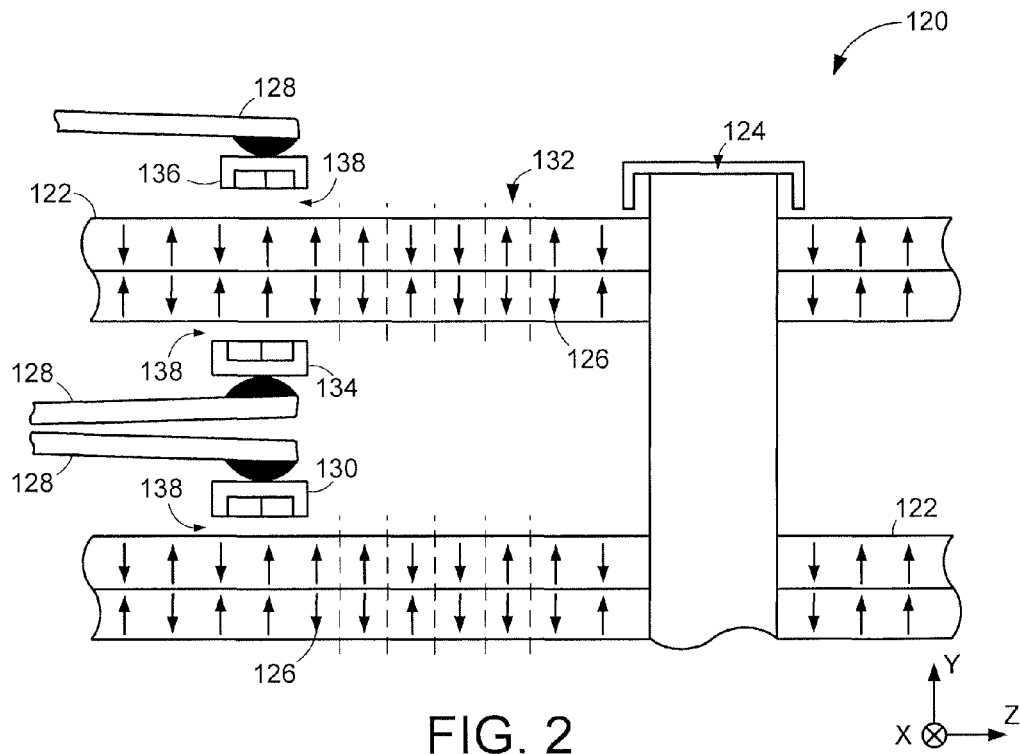
FIG. 2 shows a cross-sectional block representation of a portion of an example data storage device.

FIG. 2 displays a cross-sectional block representation of a portion of an example data storage device 120 constructed and operated in accordance with some embodiments to provide large amounts of data storage capacity, but can be susceptible to ATE. The data storage device 120 is configured with multiple data storage media 122 vertically oriented about a spindle 124. The ability to store and access data bits 126 on opposite sides of each data storage media 122 can provide large amounts of data storage capacity in a relatively small space, but can be associated with multiple different transducing assemblies 128 that have varying structural and operational characteristics.

In a non-limiting example, a first data transducing head 130 can have a magnetic extent that is smaller than a data track 132 along the X-Y plane while second 134 and third 136 data transducing heads have magnetic extents that differ, but are each greater than the corresponding data track 132 width of the proximal data storage medium 122. The difference in magnetic extents of the respective data transducing heads 130, 134, and 136 can alter data bit 126 sensing and programming across the air bearings 138 along with the risk of adjacent data track access and erasure. Such varying magnetic extents and different risks of data erasure are poorly served by a fixed data track healing threshold for all transducing heads 130, 134, and 136.

Accordingly, customized healing thresholds can be assigned to the respective transducing heads 130, 134, and 136 to minimize the number of healing operations that can consume system processing and power while maintaining data integrity and data access performance from the various data storage media 122. In yet, the magnetic extent of a transducing head is not readily apparent upon data storage device manufacture as structural, operational, and environmental conditions can manipulate the magnetic extent of a transducing head and the risk of ATE for that transducing head. Therefore, data access performance of a data transducing head can be tested to measure and predict the magnetic extent and risk of ATE for each head of a data storage device.

Figure 3:
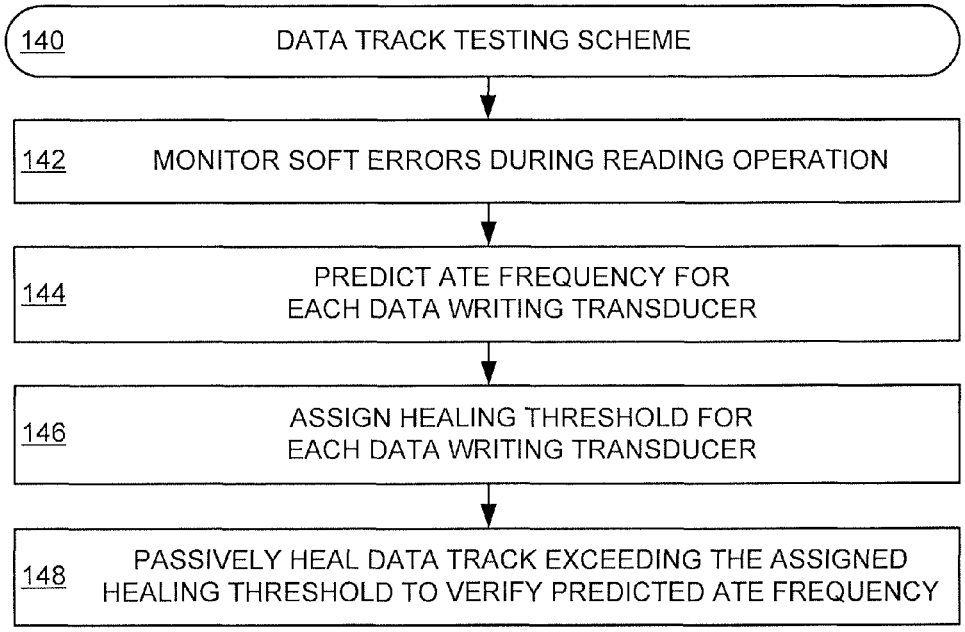
FIG. 3 maps a flowchart of an example data track testing scheme that may be carried out in accordance with some embodiments.

FIG. 3 is a flowchart of an example data track testing scheme 140 that can be carried out passively in accordance with assorted embodiments to assess the magnetic extent of one or more data transducing elements of a data storage device. The scheme 140 can begin by continually, sporadically, routinely, and randomly monitoring soft errors from at least one data storage medium in step 142. A soft error may be characterized as an incorrect data bit polarity that could be caused by any number of reasons, such as ATE and misalignment between the data track and data writer upon initial programming. In various embodiments, step 142 passively monitors for soft errors without a host prompt during read requests corresponding to a host command. For example, a scheduled or spontaneous read command operation to one or more data tracks can be serviced for that read command and the data track can be passively tested for soft errors by comparing the data present on the track to the data that should be present.

Some embodiments utilize a healing operation on a data track as the reading operation in step 142 to monitor and log the number and presence of soft errors. The ability to monitor and record soft errors passively during other reading operations preserves data access speed and available processing by piggybacking on a read channel accessing the respective data bits of a data track. The identification of the number of soft errors for a data track in step 142 can enable step 144 to predict the ATE frequency for each data writing transducer accessing the data tracks containing the soft errors. In the event a common data track for multiple data storage media is being accessed for a read operation, step 144 can divide the number of soft errors by number of data tracks being accessed, such as a data track on opposite sides each data storage medium as shown in FIG. 2.

The prediction of the ATE frequency can take into account any number of logs, tables, and algorithms to diagnose the probability that a data writing transducer inducing an ATE condition. Step 144 utilizes, in assorted embodiments, prior logged bit error rates, error correction codes, and number of data bit writes to compile a biographic profile of each data writing transducer that is subsequently used to predict an ATE frequency. Regardless of how the ATE frequency is predicted, step 146 can take the ATE forecast and assign a healing threshold for each data writing transducer based on the predicted ATE. The assigned healing threshold can take into account a number of variables, such as number of soft errors, frequency of data access operations, and data bit areal density all to provide a minimum number of data writing operations for one or more data tracks of at least one data storage medium that minimizes healing operations, but ensures data accuracy on the respective data tracks.

With the healing threshold assigned in step 146, step 148 heals at least one data track without a prompt from a host command in response to a data track being proximal to a number of data writing operations that exceeds the healing threshold assigned to that data track in step 146. The passive healing operation of step 148 may further conduct reading operations in conjunction with rewriting some, or all, of the data track to verify the predicted ATE frequency predicted in step 144. A confirmation or discrepancy between the predicted ATE frequency and the verified ATE frequency can be utilized in future healing threshold predictions and updates that may be scheduled or spontaneous.

Figure 4:
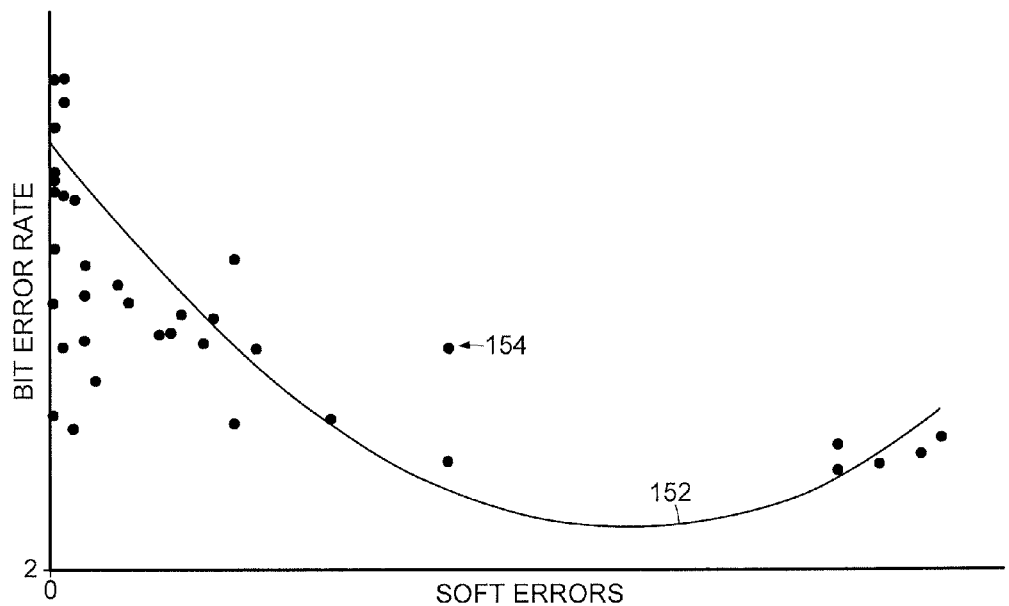
FIG. 4 plots operational data corresponding to at least one example data storage device constructed and operated in accordance with various embodiments.

The logging of predicted ATE frequencies can be used with the verified ATE frequency to optimize the prediction of ATE frequency for any number of data writing transducers of a data storage device. That is, the verification of ATE frequency can refine the correlation of measured soft errors in step 142 and the subsequent prediction of ATE frequency in step 144. FIG. 4 plots operational data from an example data storage device configured to log and verify the number of soft errors with the verified bit error rate in accordance with various embodiments. Solid line 152 corresponds with an algorithmic representation of the collective data points 154 that are each a correlation of the number of soft errors with the bit error rate of a data track.

It should be noted that the soft errors and bit error rate may relate to the same, or different, data tracks. For example, soft errors measured from a first track may be correlated with the bit error rate from an adjacent data track in some embodiments while other embodiments correlate the soft errors and bit error rate from a common data track. The correlation of soft errors with measured bit error rate for a given data track can allow for a more accurate and precise prediction of the ATE frequency for one or more data writing transducers. It is contemplated that solid line 152 is computed with logged biographic data in accordance with one or more algorithms to predict the ATE frequency of a data transducing head that comprises at least one data writing transducer.

Figure 6:
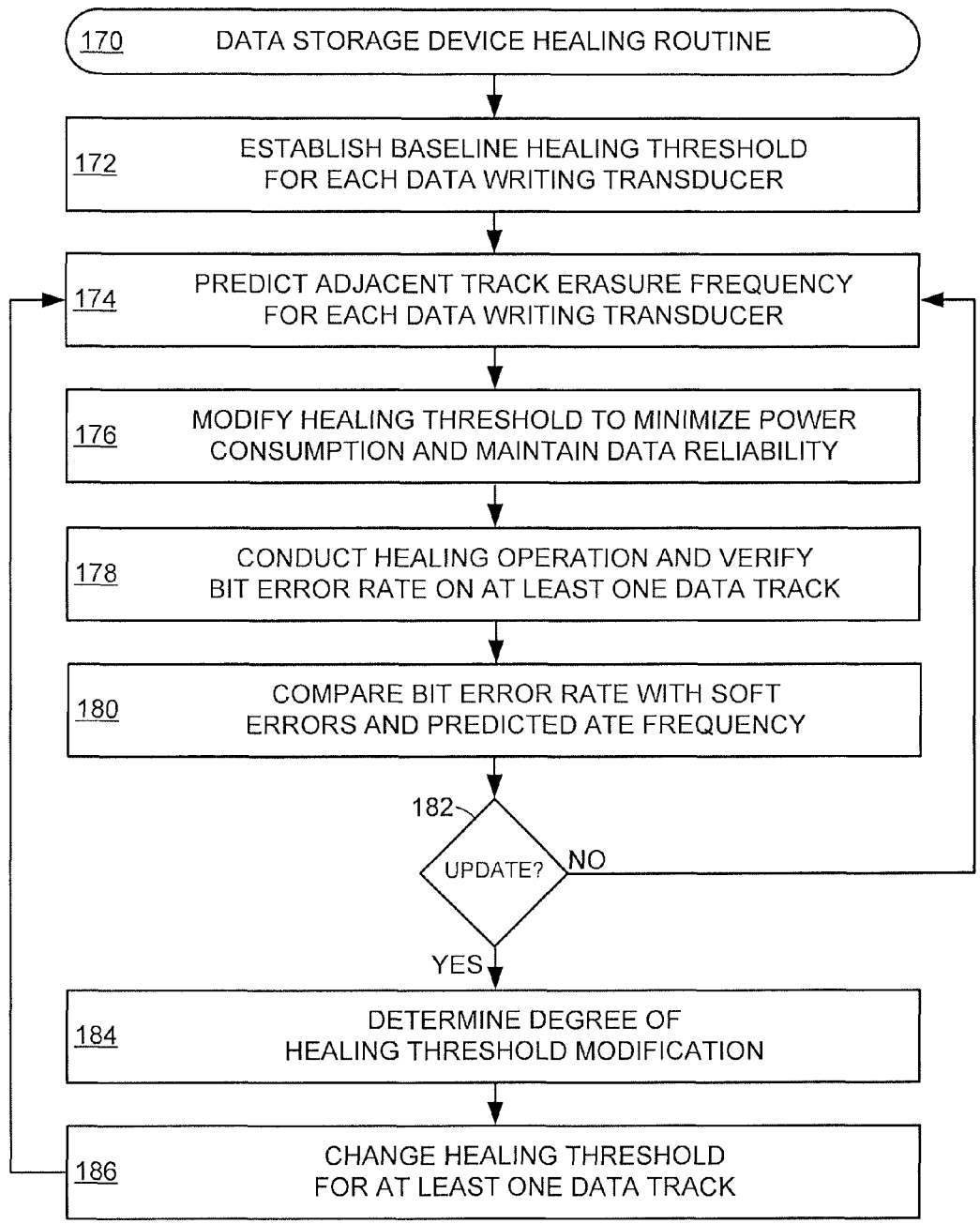
FIG. 6 provides an example data storage device healing routine that may be carried out in accordance with some embodiments.

The ability to use logged and measured operational data from one or more data writing transducers allows for adaptation of a healing threshold in response to changing conditions. FIG. 6 displays a flowchart of an example healing threshold adaptation scheme 160 that can be carried out in accordance with some embodiments to ensure the established healing thresholds for various data writing transducers are current and accurate. Soft errors for one or more data tracks are initially logged passively during a host prompted read command in step 162. The logged soft errors are then used to predict the erasure frequency for each data writing transducer in step 164. The predicted erasure frequency is next equated to a healing threshold value for at least one data track.

Decision 166 evaluates if the healing threshold based on steps 162 and 164 is different from any preexisting healing threshold for one or a plurality of data tracks and determines if a healing threshold update is called for. The determination to update a healing threshold for one or more data tracks can be configured in a variety of unlimited manners, such as quickly updating the reduction of a healing threshold and waiting for updating the raising of a healing threshold, which can maintain a balance between the number of healing operations carried out on a particular data track and the accuracy of data stored on that data track. If a healing threshold update is chosen in decision 166, step 168 proceeds to change the healing threshold before returning to step 162 where soft errors are read and logged. In the event a healing threshold update is not chosen, decision 166 returns to step 162 to continue to log soft errors.

With the continual or sporadic logging of soft errors and predicting erasure frequencies via steps 162 and 164, changing environmental conditions, like elevated temperature and humidity, as well as changing operational conditions, such as saturated data writer shields, can be accommodated. The ability to conduct the healing threshold adaptation scheme 160 passively allows for healing threshold updates without diminishing data storage performance or interrupting a host's access to stored data. The passive operation of the adaptation scheme 160 further allows for execution in conjunction with other schemes, such as scheme 140 of FIG. 3, and routines.

Figure 5:
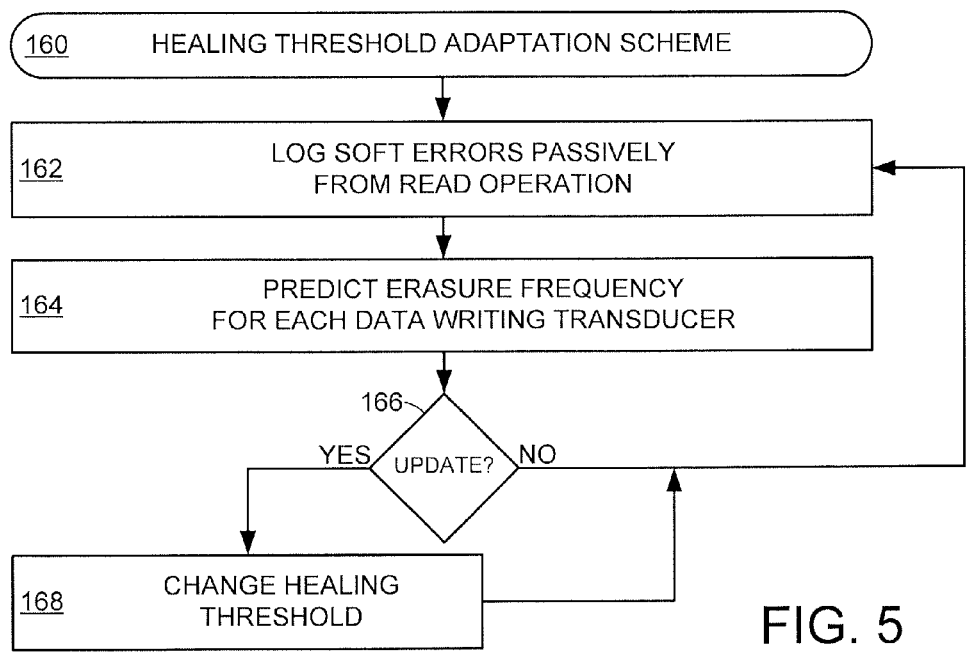
FIG. 5 illustrates an example healing threshold adaptation scheme that may be carried out in accordance with assorted embodiments.

FIG. 6 provides an example data storage device healing routine 170 that can be carried out in accordance with assorted embodiments and encompass steps and decisions from schemes 140 and 160 of FIGS. 3 and 5, respectively. Initially, the healing routine 170 establishes a baseline healing threshold for each data writing transducer in the data storage device in step 172. The baseline healing threshold may be a common or dissimilar for the various data writing transducers of the data storage device and may be based on different baseline evaluations. For instance, a first data writing transducer may be set to a 2000 proximal data writes healing threshold based on a default healing threshold while a second data writing transducer is set to a 1500 proximal data writes healing threshold based on the transducers position at the top of the stack of data storage media where heat collects.

Step 174 proceeds to predict the ATE frequency for each data writing transducer, which may be based on tables, logs, and algorithmic computations. The forecasted ATE frequencies are then implemented in step 176 by altering the baseline healing threshold for at least some data writing transducers to minimize power consumption and maintain data reliability. It is contemplated that the baseline healing threshold for one or more data writing transducers may accurately reflect the predicted ATE frequency and be unmodified in step 176. Whether a data track has a modified or baseline healing threshold, step 178 conducts a healing operation on at least one data track in response to a number of proximal data writes and verifies a bit error rate for the at least one data track during the healing operation.

The healing operation of step 178 can be executed concurrently, individually, and successively on various data writing transducers in a data storage device. As a result of the healing operation, some or all of at least one data track is rewritten to correct data bits that are incorrect compared to previous data programming operations to the data track. The verification of data track bit error rate can be compared in step 180 to logged soft errors for the data track and the predicted ATE frequency from step 174 to determine if the healing threshold established in step 176 needs to be updated. Accordingly, decision 182 evaluates the results of step 180 to determine if a healing threshold update is appropriate. Much like decision 166 of FIG. 5, decision 182 may evaluate a variety of different criteria and protocol to determine if a healing is to be updated or not.

A choice of updating a healing threshold from decision 182 advances routine 170 to step 184 where the degree of healing threshold modification is determined before step 186 changes the healing threshold in accordance with step 184. At the conclusion of step 186, or if decision 182 determines that no healing threshold is to be modified, the routine 170 returns to step 174 and the prediction of ATE frequency based on past, present, and table operational data, like soft errors, bit error rate, and existing healing thresholds. Through the cyclic prediction of ATE frequency and subsequent verification of the bit error rate for one or more data tracks, the routine 170 can continually optimize the prediction and implementation of healing thresholds.

It should be noted that the various steps and decision of routine 170 are not required or limited to that shown in FIG. 6. The assorted aspects of routine 170 can be modified and removed just as additional steps and decisions can be supplemented into any portion of the routine 170. As a non-limiting example, at least one step may be added that logs soft error occurrences and computes an estimated bit error rate based on the number of soft errors, such as via solid line 152 of FIG. 4.

With the various embodiments described herein, data storage device performance can be optimized by customizing the healing threshold for each respective data writing transducer of the data storage device. The ability to predict an ATE frequency for a data writing transducer can allow for proactive correction and adaptation of data writing operations. Moreover, customized healing thresholds can minimize unnecessary data track healing operations that degrade data storage performance without hindering the integrity and reliability of data written on the respective data tracks of the data storage device.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a data storage device having a controller connected to first and second data writing transducers, the controller adapted to set different first and second healing thresholds for the respective data writing transducers and update at least one first or second healing thresholds to a different healing threshold in response to passive data track testing during a data read command.

2. The apparatus of claim 1, wherein the data storage device comprises a hard disk drive or a hybrid drive with rotating and solid-state components.

3. The apparatus of claim 1, wherein the first and second healing thresholds are set based on one or more environmental, structural, and operational conditions.

4. The apparatus of claim 1, wherein the first and second data writing transducers correspond with different data storage mediums.

5. The apparatus of claim 1, wherein the passive data track testing comprises evaluating an adjacent track erasure (ATE) condition for the first and second data writing transducers without a host command during a read operation corresponding to a host prompted read command.

6. A method comprising:
   controlling first and second data writing transducers of a data storage device;
   conducting passive data track testing;
   setting different first and second healing thresholds for the respective data writing transducers in response to the passive data track testing; and
   updating at least one of the data writing transducers with a third healing threshold in response to the passive data track testing during a host prompted data read command, the third healing threshold being different than the first and second healing thresholds.

7. The method of claim 6, wherein the first and second healing thresholds minimize at least one of power consumption and system processing in the data storage device.

8. The method of claim 6, wherein the passive data track testing evaluates an adjacent track erasure (ATE) condition risk for the respective first and second data writing transducers.

9. The method of claim 6, wherein the setting step is conducted passively by a controller and without a host command.

10. The method of claim 6, wherein the passive data track testing is conducted during a read operation to at least one data track.

11. The method of claim 6, wherein the passive data track testing is conducted on multiple data tracks of a common data storage medium, the multiple data tracks each being concentric about a spindle aperture.

12. A method comprising:
   connecting a controller of a data storage device with first and second data writing transducers;
   conducting passive data track testing;
   predicting an adjacent track erasure (ATE) frequency for each data writing transducer; and
   setting different first and second healing thresholds for the respective data writing transducers with the controller in response to the passive data track testing and predicted ATE frequency.

13. The method of claim 12, wherein the passive data track testing measures soft errors for each data writing transducer.

14. The method of claim 13, wherein the number of soft errors is used to compute a predicted bit error rate for each data writing transducer.

15. The method of claim 14, wherein the first and second data writing transducers have different predicted bit error rates.

16. The method of claim 13, wherein the predicted bit error rate corresponds with the value of the first and second healing thresholds, respectively.

17. The method of claim 12, wherein a healing operation is conducted on a data track of a first data storage medium corresponding to the first data writing transducer, the healing operation conducted in response a number of proximal data writes by the first data writing transducer that exceeds the first healing threshold.

18. The method of claim 17, wherein the healing operation rewrites less than all the data bits on the data track.

19. The method of claim 17, wherein the healing operation is done passively and without a host prompt.

20. The method of claim 17, wherein the ATE frequency corresponds with a magnetic extent of the first data writing transducer being larger than a width of the data track of the first data storage medium.

\* \* \* \* \*